(12) United States Patent
Choisnet

(10) Patent No.: US 8,100,022 B2
(45) Date of Patent: Jan. 24, 2012

(54) DEVICE FOR MEASURING THE TOTAL PRESSURE OF A FLOW AND METHOD IMPLEMENTING THE DEVICE

(75) Inventor: Joël Choisnet, Naveil (FR)

(73) Assignee: Thales (FR)

( * ) Notice: Subject to any disclaimer, the term of this patent is extended or adjusted under 35 U.S.C. 154(b) by 0 days.

(21) Appl. No.: 12/515,159

(22) PCT Filed: Nov. 7, 2007

(86) PCT No.: PCT/EP2007/061976
§ 371 (c)(1),
(2), (4) Date: Nov. 23, 2009

(87) PCT Pub. No.: WO2008/058872
PCT Pub. Date: May 22, 2008

(65) Prior Publication Data
US 2010/0071479 A1    Mar. 25, 2010

(30) Foreign Application Priority Data

Nov. 17, 2006 (FR) ...................................... 06 10076

(51) Int. Cl.
*G01F 1/46* (2006.01)
(52) U.S. Cl. .................................................... 73/861.65
(58) Field of Classification Search ............... 73/861.65, 73/182, 866.333, 861.66, 861.67; 374/143
See application file for complete search history.

(56) References Cited

U.S. PATENT DOCUMENTS

| | | | |
|---|---|---|---|
| 3,364,742 A | | 1/1968 | De Leo |
| 5,337,602 A | * | 8/1994 | Gibson ........................... 73/182 |
| 5,628,565 A | * | 5/1997 | Hagen et al. .................. 374/143 |
| 6,668,640 B1 | | 12/2003 | Alwin et al. |
| 6,711,959 B2 | * | 3/2004 | Rejewski .................... 73/861.65 |
| 6,904,814 B2 | * | 6/2005 | May ........................ 73/862.333 |

FOREIGN PATENT DOCUMENTS

| | | |
|---|---|---|
| FR | 2823846 | 10/2002 |
| WO | WO 02/086516 | 10/2002 |

* cited by examiner

*Primary Examiner* — Jewel V Thompson
(74) *Attorney, Agent, or Firm* — Lowe Hauptman Ham & Berner, LLP

(57) ABSTRACT

The invention relates to a device and to a method for measuring the total pressure of a flow. According to the invention, the device comprises a Pitot tube (25), means for measuring the total pressure at a stagnation point (4, 12) and comparison means (32, 33) for comparing pressures measured by the Pitot tube (25) and the means for measuring total pressure at the stagnation point (4, 12), the Pitot tube (25) and the means for measuring total pressure at the stagnation point (4, 12) being joined together and tapping air streams off the flow along the same axis (7). The method implementing the device includes comparing the measured pressures and if the difference between the two measured pressures is greater than a given discrepancy, then a warning is generated specifying that only the higher pressure has a good likelihood of being correct.

20 Claims, 3 Drawing Sheets

DEVICE FOR MEASURING THE TOTAL PRESSURE OF A FLOW AND METHOD IMPLEMENTING THE DEVICE

CROSS-REFERENCE TO RELATED APPLICATIONS

The present Application is based on International Application No. PCT/EP2007/061976, filed on Nov. 7, 2007, which in turn corresponds to French Application No. 0610076, filed on Nov. 17, 2006, and priority is hereby claimed under 35 USC §119 based on these applications. Each of these applications are hereby incorporated by reference in their entirety into the present application.

FIELD OF THE INVENTION

The invention relates to a device for measuring the total pressure of a flow. The invention also relates to a method for implementing a device according to the invention.

BACKGROUND OF THE INVENTION

Flying any aircraft requires knowledge of its airspeed, that is to say of its speed in relation to the relative wind. This speed is determined using sensors that sense the static pressure Ps, the total pressure Pt, the angle of attack α and the side-slip angle β. α and β provide the direction of the velocity vector in a reference system, or frame of reference, associated with the aircraft, and Pt-Ps provides the modulus of this velocity vector. The four aerodynamic parameters therefore make it possible to determine the velocity vector of an aeroplane and, as a side issue, of a tilt-rotor aircraft of the so-called "convertible" type.

The total pressure Pt is usually measured using a tube known as a Pitot tube. This is a tube that is open at one of its ends and closed at the other. The open end of the tube faces substantially into the flow.

Inside the Pitot tube, near the closed end, is located a means for measuring the air pressure therein. The stream of air situated upstream of the tube is gradually slowed until it reaches a zero speed at the entrance to the tube.

The slowing of the speed of the air tends to increase the air pressure. This increased pressure forms the total pressure Pt of the airflow.

In practice, the airflow may carry solid or liquid particles liable to enter the Pitot tube and to build up in the tube at the closed end. In order to avoid such a build-up disrupting the pressure measurement, the closed end generally has a drain-hole through which any particles can be removed.

Both the particles and some of the air that has entered the Pitot tube flow through this hole. Hence, the slowing of the air in the tube is incomplete and the total pressure Pt measurement is corrupted thereby. More specifically, the more effort is made in avoiding the build-up of large-sized particles, the more the total pressure measurement is corrupted as the dimensions of the drain-hole increase.

Conversely, the more effort is put into improving the total pressure Pt measurement by decreasing the dimensions of the drain-hole, the more the risk of a build-up of particles increases.

With a Pitot tube, it is therefore necessary to reach a compromise between the quality of the total pressure Pt measurement and the risk of the measurement being disrupted as a result of particles carried by the airflow where the measurement is taken.

In order to lessen the effects of this shortcoming a probe that measures total pressure at a stagnation point is used. More specifically, this probe taps off at least two air streams from an airflow and brings them into contact with one another in order to slow them down. The pressure in the zone where the air is slowed is measured and this measured pressure gives the total pressure of the flow. A probe such as this is described in French patent application No. FR 2 823 846.

The two types of probe, Pitot tube and stagnation point probe, are not susceptible to the same risks of blockage. Pitot tubes are susceptible to small-sized particles that might block their drain-hole. Stagnation point probes are susceptible to larger-sized particles, such as a bird, for example, obstructing the zone at which the air streams are tapped off.

SUMMARY OF THE INVENTION

It is an object of the invention to address this problem by proposing to combine the two types of probe.

Another object of the invention is to propose a redundant probe in which the total pressure measurement is taken using two different principles. This then limits any common mode failures which would adversely affect redundant probes operating on the same principle.

To this end, a subject of the invention is a device for measuring the total pressure of a flow, comprising a Pitot tube, characterized in that it further comprises means for measuring the total pressure at a stagnation point and comparison means for comparing pressures measured by the Pitot tube and the means for measuring total pressure at the stagnation point, the Pitot tube and the means for measuring total pressure at the stagnation point being joined together and tapping air streams off the flow along the same axis.

Another subject of the invention is a method of measuring the total pressure of a flow implementing the device described above, characterized in that it consists in:
 comparing the measured pressures,
 if the difference between the two measured pressures is greater than a given discrepancy, then a warning is generated specifying that only the higher pressure has a good likelihood of being correct.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
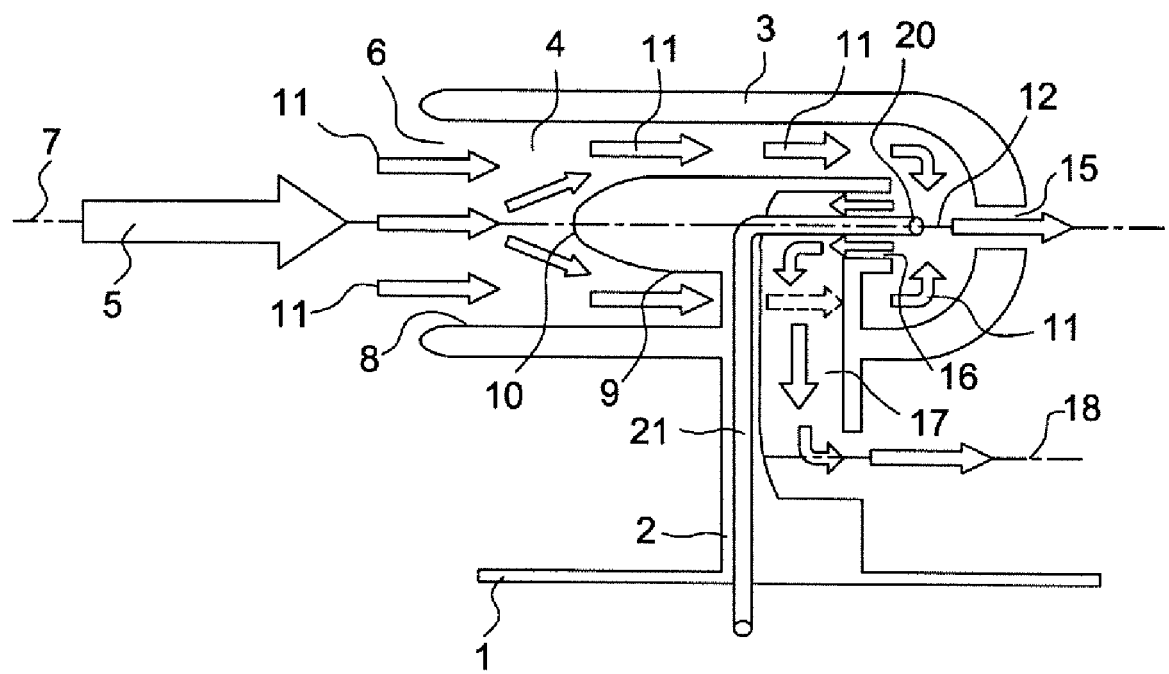
FIG. 1 depicts a device for measuring the total pressure of a flow comprising means for measuring the total pressure at the stagnation point.

FIG. 1 depicts a device for measuring total pressure the position of which is fixed relative to the skin 1 of an aircraft on which it is positioned. The device is fixed to a strut 2 securing it to the skin 1. The device comprises a hollow body 3 comprising a duct 4. The device is situated in an airflow the direction of which is depicted by the arrow 5.

Several streams of air are tapped off in an annulus from the flow and guided along one and the same duct 4. More specifically, the duct 4 comprises an upstream end 6 opening substantially at right angles to the direction 5 of the flow. The duct 4 has a substantially tubular shape about an axis 7.

The duct 4 is situated between an outer cylindrical wall 8 and an inner cylindrical wall 9. The two walls extend along the axis 7. At the upstream end 6, the inner cylindrical wall 9 terminates in a rounded end 10 enabling the air streams entering the duct 4 to be separated. The embodiment depicted in FIG. 1 advantageously exhibits symmetry of revolution about the axis 7 directed in the direction 5 of the airflow.

The flow of the air streams flowing along the duct 4 is denoted by arrows 11. Various air streams flow along the duct 4 and are brought into contact with one another in order to form a stagnation point in a zone 12 of the hollow body 3 before leaving the hollow body 3 via at least one downstream orifice. The duct 4 closes up again around the zone 12 where the various air streams flowing through the duct 4 are brought into contact so that they slow one another down.

In the embodiment depicted, the hollow body 3 comprises two downstream orifices 15 and 16. The orifice 15 is situated in the continuation of the outer wall 8 and allows the air streams to leave the zone 12 directly in the flow in the direction 5 along the axis 7. The orifice 16 is situated in the continuation of the inner wall 9 and allows the air streams to leave the zone 12 in the opposite direction to the direction 5 of the flow. The air streams leaving the orifice 16 emerge into an inner duct 17 located partially inside the strut 2 and discharging the air streams therein into the flow along an axis 18 parallel to the axis 7.

An orifice 20 of a tube 21 is situated in the zone 12 and forms a pressure tapping in the zone 12. The hollow body 3 is secured to the strut 2 inside which the tube 21 extends.

The air pressure in the zone 12 is representative of the total pressure Pt in the flow. The tube 21 is connected at its second end to pressure measuring means such as, for example, a pressure sensor. This pressure sensor may be situated inside the aircraft, in which case the tube 21 extends from inside the hollow body 3 as far as the inside of the aircraft, passing along inside the strut 2.

The duct 4 formed between the walls 8 and 9 has been depicted in a fixed position relative to the skin 1 of the aircraft. It is equally possible for the duct 4 to be fixed to a mobile vane so as to improve the alignment of the duct 4 with respect to the axis 7 of the flow as the aircraft changes course with respect to the axis 7 of the flow.

Figure 2:
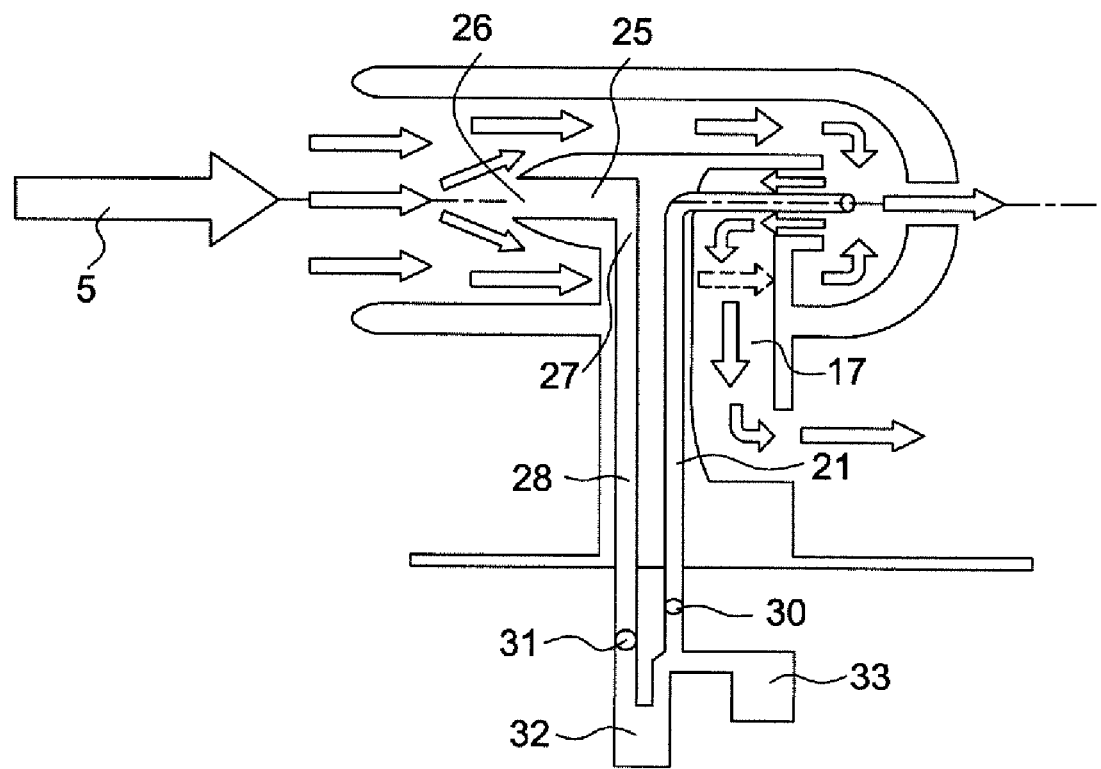
FIG. 2 depicts a device for measuring the total pressure of a flow comprising both a Pitot tube and means for measuring total pressure at the stagnation point, the device being fixed relative to the skin of an aircraft.

FIG. 2 depicts a device for measuring the total pressure of a flow comprising both a Pitot tube 25 and means for measuring total pressure at a stagnation point. More specifically, it shows again the various elements of the device of FIG. 1, plus the Pitot tube 25 comprising an opening 26 for tapping air from the flow. The opening 26 is situated inside the duct 4. The Pitot tube 25 advantageously comprises a drain-hole, not depicted in FIG. 2, which allows any particles which may have entered the Pitot tube 25, such as water droplets present in the flow for example, to be removed from the tube. The drain-hole opens at the bottom of the Pitot tube and emerges for example in the inner duct 17.

Advantageously, the opening 26 of the Pitot tube 25 is situated downstream of the upstream end 6 that forms an opening, also bearing the reference 6. The opening 6 of the means for measuring total pressure at a stagnation point allows streams of air to be tapped off the flow. The adjectives upstream and downstream are defined as a function of the direction 5 of the flow. The opening 26 of the Pitot tube 25 is situated on the inner cylindrical wall 9 at the rounded end 10. The air flowrate inside the Pitot tube 25 is very much lower than that of the air flowing through the duct 4 towards the zone 12. As a result, the presence of the Pitot tube 25 inside the duct 4 causes a negligible disruption to the operation of the means for measuring total pressure at a stagnation point. In addition, the fact that the opening 26 is situated downstream of the opening 6 allows the flow to be guided upstream of the Pitot tube 25. This guidance improves the total pressure measurement taken by the Pitot tube even if the axis 5 of the flow is angularly offset from the axis 7 of the duct 4, for example when the local incidence of the flow near the device varies.

Advantageously, the opening 26 of the Pitot tube 25 is substantially circular and centred on the axis 7 of the duct 4, the reason for this being to ensure that the device is nicely symmetrical and more specifically that the flow of the air streams inside the duct 4 is symmetrical. This symmetry is important for ensuring a good position of the zone 12.

An orifice 27 of a tube 28 is situated at the closed end of the Pitot tube 25 and makes it possible to create a pressure tapping intended to measure the pressure at the closed end of the Pitot tube 25. This pressure corresponds to the total pressure of the flow. The tube 28 extends inside the strut 2. The pressure tappings in the zone 12 and of the Pitot tube 25 provide two redundant information items regarding the total pressure of the flow. These two information items are obtained using different principles, one using a Pitot tube and the other using a stagnation point, and are therefore not susceptible to the same risks of errors.

The device further comprises comparison means for comparing the pressures measured by the Pitot tube 25 and by the means for measuring total pressure at the stagnation point. Each of the tubes 21 and 28 has a second end, 30 and 31 respectively, situated inside the aircraft. In a simple way, it is possible to measure each of the pressures in the tubes 21 and 28 using two pressure sensors, each positioned at one of the ends 30 and 31. The comparison means compare the values obtained by each of the pressure sensors.

Advantageously, the comparison means comprise a differential-pressure sensor or flowmeter 32 that makes it possible to dispense with one of the two pressure sensors.

Advantageously, the device comprises just one absolute-pressure sensor 33 that measure the pressure at the means for measuring the total pressure at a stagnation point. Specifically, the stagnation point makes it possible to tolerate particles entering the duct 4 that are of larger sizes that can be tolerated by the Pitot tube 25 without any drift in total pressure measurement. The risk of blocking is therefore lower for the means for measuring total pressure at a stagnation point. In downgraded operation, it is possible to make do with the measurement provided by the sensor 33 associated with the means for measuring total pressure at a stagnation point.

FIG. 2 describes a device comprising the Pitot tube 25 and the means for measuring total pressure at a stagnation point having a fixed position relative to the skin 1 of an aircraft. It is equally possible, in order to limit the effect of changes in local incidence of the flow on the pressure measurements, to secure the Pitot tube 25 and the means for measuring total pressure at a stagnation point to means intended to self-orientate along the axis 5 of the flow.

Figure 3:
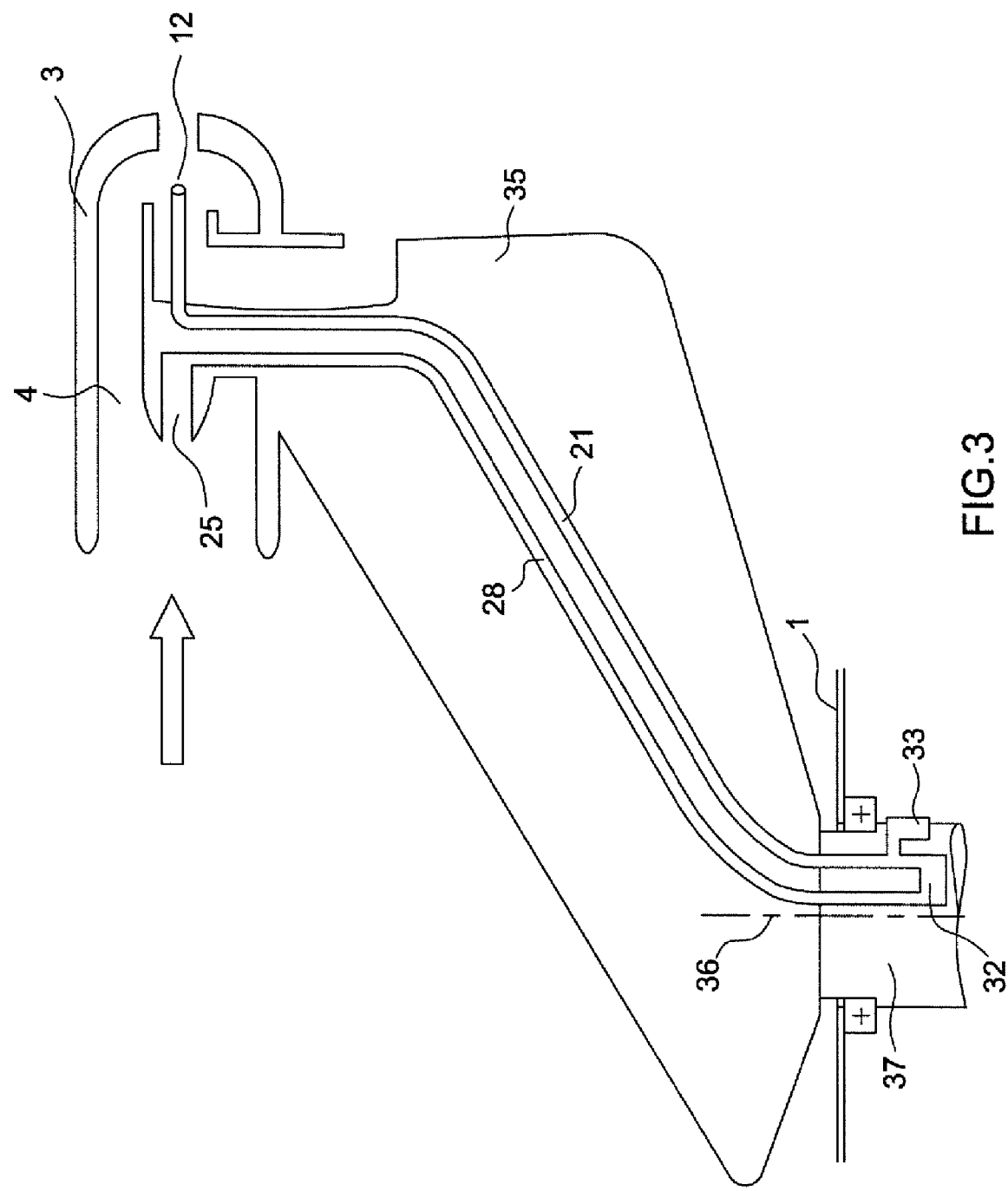
FIG. 3 depicts the device of FIG. 2 secured to a vane intended to self-orientate along the axis of the flow.

FIG. 3 depicts another embodiment of the invention, in which the hollow body 3 has a movable position relative to the skin 1 of an aircraft. Arranged inside the hollow body 3, as in the embodiment of FIG. 2, are the duct 4 and the zone 12 that form the means for measuring total pressure at a stagnation point, as well as the Pitot tube 25. The hollow body 3 is fixed to a vane 35 that can move about an axis 36. The vane 35 is intended to self-orientate in the flow as a function of the local incidence of the flow near the device. The vane 35 is secured to a shaft 37 substantially perpendicular to the skin 1 of the aircraft. A bearing 38, for example of the rolling-contact type, allows the shaft 37 to rotate easily relative to the skin of the aircraft while at the same time positioning the bearing accurately in relation to the degrees of freedom other than the degree of freedom to rotate about the axis 36.

When the pressure sensors 32 and 33 connected to the tubes 21 and 28 are situated on the inside of the skin 1 of the aircraft, it is advantageous to interpose between, on the one hand, the tubes 21 and 28 and, on the other hand, the pressure sensors 32 and 33, a rotary joint, not depicted in FIG. 3, so as to keep the pressure sensors 32 and 33 in a fixed position relative to the aircraft. The rotary joint may conventionally be embodied in the form of an articulation. The rotary joint may advantageously be created by interposing flexible hoses between the tubes 21, 28 and the pressure sensors 32, 33, as described in French patent application FR 2 847 672 filed in the name of the Applicant Company.

Advantageously, the device comprises heating means allowing it to operate at high altitude, in an environment where ice may form on the walls of the device and, more specifically, in the duct 4 or in the Pitot tube 25, these means for example comprising a resistive heating element embedded in solid parts of the probe surrounding the duct 4 and the Pitot tube 25. The heating means may be used both for a device with a fixed position and for a device with a movable position relative to the skin of the aircraft. In the case of a device the position of which can move, wires powering the resistive element pass through the rotary joint.

Figure 4:
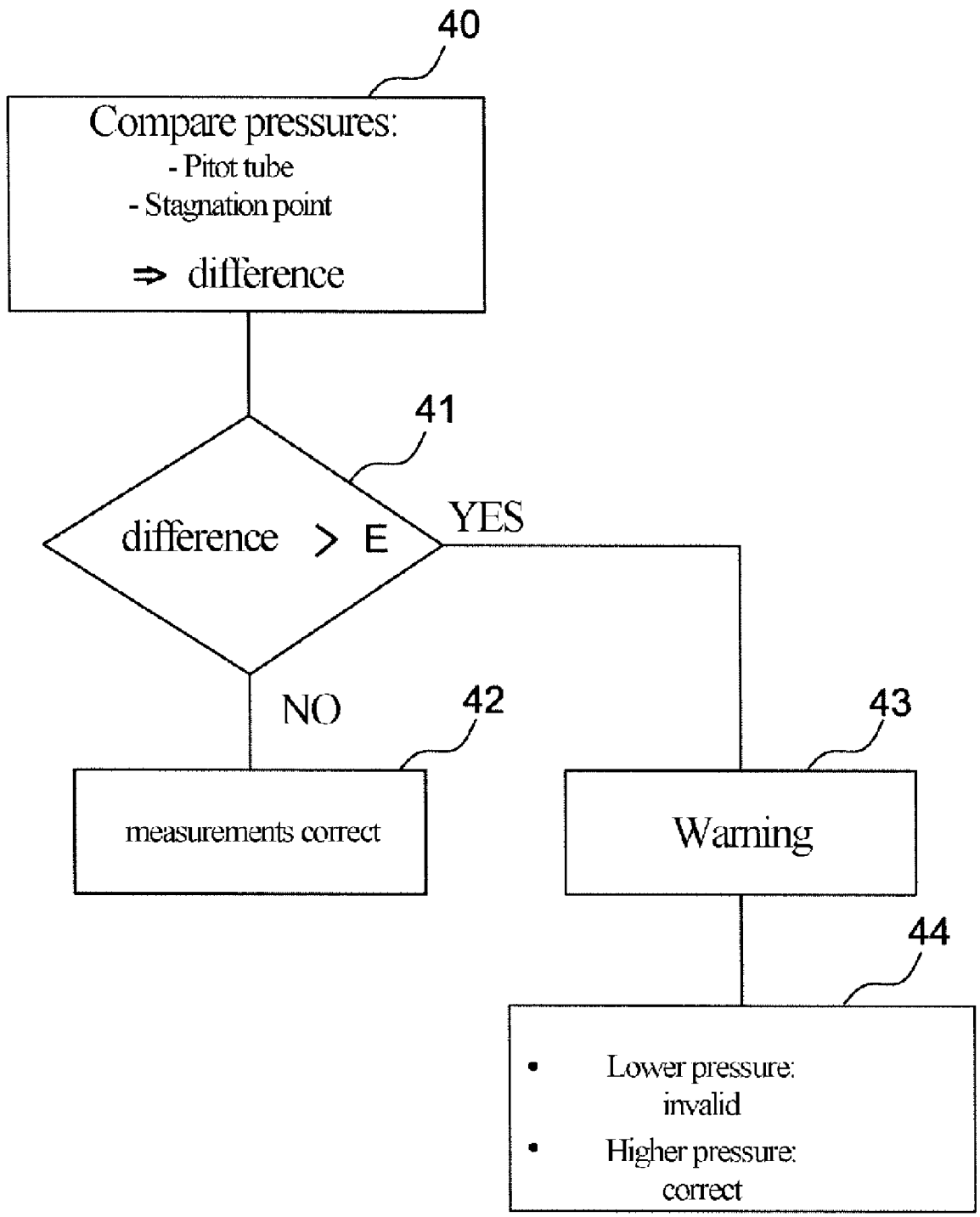
FIG. 4 depicts steps of a method implementing the device of the invention.

FIG. 4 depicts steps of a method implementing the device of the invention.

A first step 40 is to compare the pressures measured by the two pressure tappings, that associated with the Pitot tube and that associated with the stagnation point. In other words, a comparison is made between the pressures measured at the two tubes 21 and 28. The comparison may be performed directly by the flowmeter or differential-pressure sensor 32. In the case of a flowmeter, the difference in pressure is dependent on the density of the air and the temperature thereof. These two parameters are determined by means of other probes external to the device.

A second step 41 is to compare the difference obtained in step 40 against a given discrepancy E which may be dependent on the phase of flight of the aircraft, namely takeoff, landing or cruising flight. In cruising flight, the value of the discrepancy E may be dependent on whether or not reduced vertical separation between aircraft, well known by its English-language acronym RVSM (which stands for "Reduced Vertical Separation Minimum") is being practiced. If the difference is smaller than the given discrepancy E then a step 42 considers that the two measured pressure are correct. If, on the other hand, the difference between the two measured pressures is greater than the given discrepancy E, then a step 43 involves the generation of a warning aimed at the pilot of the aircraft, specifying that only the higher pressure has a good likelihood of being correct. Next, in a step 44, the lower pressure measurement is declared invalid and the higher pressure measurement is kept.

What actually happens in a total pressure measurement device is that the most probable cause of breakdown is blockage either of the duct 4 leading to the zone 12 or of the Pitot tube 25. Such a blockage leads to a pressure measurement close to the static pressure of the flow and therefore lower than the total pressure. Declaring one measurement invalid makes it possible to generate a warning in order to alert operators, such as the pilot and the ground crew of the aircraft.

In the case of a device comprising a differential-pressure sensor 32 and an absolute sensor 33, if the value measured by the sensor 33 is declared invalid, then in order to obtain the value measured at the end 31 of the tube 28, the measurement taken by the sensor 33 is added, even if this measurement has been declared invalid, to the measurement from the differential-pressure sensor 32.

If the duct 4 and the Pitot tube 25 both become blocked simultaneously, for example in the event of birdstrike on the device, both pressure measurements are declared invalid. This scenario can be detected by a sudden variation in the measured pressures. A variation such as this is unlikely under normal flight conditions and will therefore be interpreted as indicating a fault with the entire device.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for measuring a total pressure of a flow, comprising:
    a pitot tube configured to measure the total pressure of the flow,
    a measuring tool joined with the pitot tube and configured to measure the total pressure at a stagnation point, and
    a comparison tool configured to compare the pressure measured by the pitot tube and the measuring tool,
    wherein
    the pitot tube and the measuring tool are configured to tap air streams off the flow along the same axis, thereby the air streams contact with each other to slow one another down, and
    a pressure, in a zone where the air streams come into contact with each other being measured by the measuring tool and the pitot tube, defines the total pressure of the flow.

2. The device according to claim 1,
    wherein the measuring tool comprises a duct of substantially tubular shape, the duct opening substantially at right angles to the axis of the flow in order to tap the air streams from the flow and said zone where the air streams flowing through the duct contact each other, and
    wherein the Pitot tube comprises an opening for tapping air from the flow, and wherein the opening is situated inside the duct.

3. The device according to claim 2, wherein the opening of the Pitot tube is situated downstream of an opening of the measuring tool, the opening allowing the air streams to be tapped off the flow.

4. The device according to claim 2, wherein the duct is elongated in an axis that substantially coincides with the axis of the flow, and wherein the opening of the pitot tube is substantially circular and centred on the axis of the duct.

5. The device according to claim 3, wherein the duct is elongated in an axis that substantially coincides with the axis of the flow, and wherein the opening of the pitot tube is substantially circular and centred on the axis of the duct.

6. The device according to claim 1, wherein the comparison tool comprises a differential-pressure sensor or a flowmeter.

7. The device according to claim 1, further comprising one single absolute-pressure sensor that measures the pressure at the measuring tool.

8. The device according to claim 1, wherein the Pitot tube and the measuring tool occupy a fixed position relative to a skin of an aircraft.

9. The device according to claim 1, wherein the Pitot tube and the measuring tool are secured to an object that is intended to self-orientate along the axis of the flow.

10. A method of measuring the total pressure of a flow implementing a device according to claim 1, comprising:
   comparing the measured,
      if a difference between the two measured pressure is greater than a given discrepancy, generating a warning specifying that only the higher pressure has a good likelihood of being correct.

11. The Method according to claim 10, wherein after the warning has been generated, the lower pressure measurement is declared invalid and the higher pressure measurement is kept.

12. The device according to claim 2, wherein the comparison tool comprises a differential-pressure sensor or a flowmeter.

13. The device according to claim 3, wherein the comparison tool comprises a differential-pressure sensor or a flowmeter.

14. The device according to claim 2, further comprising one single absolute-pressure sensor that measures the pressure at the measuring tool.

15. The device according to claim 3, further comprising one single absolute-pressure sensor that measures the pressure at the measuring tool.

16. The device according to claim 2, wherein the Pitot tube and the measuring tool occupy a fixed position relative to a skin of an aircraft.

17. The device according to claim 3, wherein the Pitot tube and the measuring tool occupy a fixed position relative to a skin of an aircraft.

18. The device according to claim 3, wherein the Pitot tube and the measuring tool are secured to an object that is intended to self-orientate along the axis of the flow.

19. The device according to claim 3, wherein the Pitot tube and the measuring tool are secured to an object that is intended to self-orientate along the axis of the flow.

20. The device according to claim 4, wherein the Pitot tube and the measuring tool are secured to an object that is intended to self-orientate along the axis of the flow.

* * * * *